US007925957B2

(12) United States Patent
King et al.

(10) Patent No.: US 7,925,957 B2
(45) Date of Patent: Apr. 12, 2011

(54) VALIDATING DATA USING PROCESSOR INSTRUCTIONS

(75) Inventors: Steven R. King, Portland, OR (US); Frank L. Berry, North Plains, OR (US); Abhijeet Joglekar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1180 days.

(21) Appl. No.: 11/384,527

(22) Filed: Mar. 20, 2006

(65) Prior Publication Data

US 2007/0226580 A1 Sep. 27, 2007

(51) Int. Cl.
*H03M 13/00* (2006.01)

(52) U.S. Cl. .................... 714/758; 714/763; 714/770

(58) Field of Classification Search ............... 714/758, 714/763, 769, 770, 753, 801; 711/123, 213
See application file for complete search history.

(56) References Cited

U.S. PATENT DOCUMENTS

| | | | |
|---|---|---|---|
| 5,109,498 A * | 4/1992 | Kamiya et al. ............... 711/123 |
| 5,323,403 A | 6/1994 | Elliott |
| 5,663,952 A * | 9/1997 | Gentry, Jr. ................ 370/252 |
| 5,701,316 A | 12/1997 | Alferness et al. |
| 5,946,467 A | 8/1999 | Pathakis et al. |
| 5,974,574 A | 10/1999 | Lennie et al. |
| 6,029,186 A | 2/2000 | DesJardins et al. |
| 6,191,614 B1 | 2/2001 | Schultz et al. |
| 6,237,074 B1 * | 5/2001 | Phillips et al. ............. 711/213 |
| 6,279,140 B1 * | 8/2001 | Slane ......................... 714/807 |
| 6,631,488 B1 | 10/2003 | Stambaugh et al. |
| 6,907,466 B2 | 6/2005 | Alexander et al. |
| 6,957,321 B2 | 10/2005 | Sheaffer ..................... 712/209 |
| 6,964,008 B1 * | 11/2005 | Van Meter, III ............ 714/807 |
| 7,272,586 B2 | 11/2007 | Dewan |
| 7,360,142 B1 * | 4/2008 | Barash ....................... 714/758 |
| 7,421,637 B1 | 9/2008 | Martinez et al. |
| 7,594,124 B2 | 9/2009 | Durham et al. |
| 2004/0037319 A1 | 2/2004 | Pandya |
| 2004/0113814 A1 | 6/2004 | Lochner |
| 2004/0158793 A1 | 8/2004 | Blightman et al. |
| 2004/0243729 A1 | 12/2004 | Milliken |

(Continued)

FOREIGN PATENT DOCUMENTS

EP 0 609 595 8/1994

(Continued)

OTHER PUBLICATIONS

Intel Corporation, "Metro Ethernet: End-To-End Single Vendor Connectivity," Apr. 7, 2005, pp. 1-9.

(Continued)

*Primary Examiner* — Fritz Alphonse
(74) *Attorney, Agent, or Firm* — Trop, Pruner & Hu, P.C.

(57) ABSTRACT

In one embodiment, the present invention includes a method for determining from a data block in a buffer a number of first operands in a first portion of the buffer and a number of second operands in a second portion of the buffer. Based on these numbers, a cyclic redundancy checksum (CRC) operation may be iteratively performed on the first and second operands to obtain a checksum result. The first and second operands are of a different length, and the checksum operation may be executed using processor instructions corresponding to the different lengths. Other embodiments are described and claimed.

18 Claims, 5 Drawing Sheets

U.S. PATENT DOCUMENTS

2006/0242532 A1     10/2006     Joglekar et al. ............... 714/758

FOREIGN PATENT DOCUMENTS

| TW | 200414042 A | 8/2004 |
|----|-------------|--------|
| TW | 200414045 A | 8/2004 |
| TW | I224729     | 9/2004 |
| TW | I238945     | 9/2005 |

OTHER PUBLICATIONS

U.S. Appl. No. 11/233,742, filed Sep. 23, 2005, entitled "Techniques To Determine Integrity of Information," by Ronald L. Dammann, et al.

U.S. Appl. No. 11/230,720, filed Sep. 19, 2005, entitled "Techniques to Perform Prefetching of Content in Connection With Integrity Validation Value Determination" by Steven R. King and Frank L. Berry.

U.S. Appl. No. 11/115,656, filed Apr. 26, 2005, entitled "Techniques to Provide Information Validation and Transfer" by Abhijeet Joglekar; Frank L. Berry.

U.S. Appl. No. 11/316,772, filed Dec. 23, 2005, entitled "Performing a Cyclic Redundancy Checksum Operation Responsive to a User-Level Instruction" by Steven R. King, et al.

"The iSCSI CRC23C Digest and the Simultaneous Multiply and Divide Algorithm". Tuikov, Luben and Vicente Cavanna. Jan. 30, 2002.

"Accelerating High-Speed Networking with Intel® I/O Acceleration Technology". Intel® I/O Acceleration Technology White Paper. May 2005.

"A Painless Guide to CRC Error Detection Algorithms". Ross N. Williams. Aug. 19, 2003. http://www.ros.net/crc/download/crc_v3.txt.

"Intel® IOP332 I/O Processor with Intel XScale® Microarchitecture" http://www.intel.com/design/iio/iop332.htm. Date Unknown.

"Intel® IQ80332 Software Development and Processor Evaluation Kit". http://www.intel.com/design/iio/devkits/iq80332.htm. Date Unknown.

Keith Lauritzen, et. al., Technology@Intel Magazine, "Intel I/O Acceleration Technology Improves Network Performance, Reliabiltiy and Efficiently," Mar. 2005, pp. 1-11.

Emily R. Blem et al., *Instruction Set Extensions for Cyclic Redundancy Check on a Multithreaded Processor*, 7th Workshop on Media and Stream Processors, Dec. 12, 2005, Barcelona, Spain.

State Intellectual Property Office, P.R. China, First Office Action dated Apr. 7, 2010, in Chinese patent application No. 2007800009844.0.

European Patent Office, Combined Search Report and Search Opinion for EPO Application No. 07758495.1, dated Apr. 29, 2010, 10 pgs.

"Intel I/O Acceleration Technology," Date Unknown, pp. 1-2.

Patent Cooperation Treaty, Notification of International Search Report and Written Opinion mailed Jul. 20, 2007 in international application No. PCT/US2006/047234.

U.S. Patent and Trademark Office, Office Action mailed Sep. 17, 2008 with Reply filed on Dec. 16, 2008 in U.S. Appl. No. 11/316,772.

U.S. Patent and Trademark Office, Office Action Apr. 15, 2009 with Reply filed on Jul. 13, 2009 in U.S. Appl. No. 11/316,772.

U.S. Patent and Trademark Office, Office Action mailed Oct. 15, 2009 with Reply filed omn Jan. 14, 2010 in U.S. Appl. No. 11/316,772.

U.S. Patent and Trademark Office, Office Action mailed Apr. 26, 2010 with Reply filed on Jul. 22, 2010 in U.S. Appl. No. 11/316,772.

Chinese Patent Office, Office Action dated Feb. 5, 2010, in Chinese patent application serial No. 200680042242.0.

U.S. Patent and Trademark Office, Notice of Allowance mailed Oct. 14, 2010 in U.S. Appl. No. 11/316,772.

Taiwanese Patent Office, Office Action mailed Dec. 20, 2010 in Taiwanese patent application No. 095146431.

U.S. Patent and Trademark Office, Notice of Allowance Mailed Feb. 2, 2010 in U.S. Appl. No. 11/316,772.

\* cited by examiner

VALIDATING DATA USING PROCESSOR INSTRUCTIONS

BACKGROUND

Embodiments of the present invention relate to data processing, and more particularly to determining checksums such as cyclic redundancy checks (CRCs).

In data processing systems, data transmitted between a first location and a second location should be received accurately, so that additional processing performed on that data at the second location also can be accurate. Further, to enable detection of errors in data transmission, oftentimes data validation is performed. One example of data validation is through use of a checksum attached to a data packet to be transmitted. For example, a CRC sum can be generated by a transmitting source and appended to data to be transmitted. This checksum, which may be calculated according to one of many different algorithms, can then be compared to a similar checksum generated at the receiving end from the received data. If the two checksums are identical, the receiving system may have high confidence that the transmitted data is uncorrupted. If however the generated checksum varies from the transmitted checksum, an error is indicated. Such checksums are used throughout networking technologies to detect transmission errors. Other uses include database integrity, application-level data integrity checks, and the like.

In different applications, different manners of implementing CRC information exist. For example, CRC calculations can be performed in either hardware or software. To implement a CRC calculation in hardware, typically a dedicated hardware engine is provided within a system to perform the CRC calculation. Accordingly, data to be subjected to such a CRC calculation is sent to the hardware engine for calculation of the CRC, which is then appended to the data, e.g., for transmission from the system. Various drawbacks exist to using such an offload engine, including the overhead of sending data to the engine. Furthermore, it is difficult to perform a stateless hardware offload as typically additional state-based overhead data also needs to be transmitted, increasing complexity and slowing the progress of useful work.

Because many systems lack such an offload engine, CRC calculations are often performed in software. To implement CRC calculations in software, typically lookup table schemes are used. However, such software calculations of CRC values are notoriously slow, compute-intensive operations. Further, the memory footprint of the lookup table can be large, impacting performance. Accordingly, these slow calculations can degrade network performance, and further consume processing resources. As an example, it can take between 5 and 15 processor cycles to perform a CRC calculation per byte of data. As a result, software CRC performance is too low for general use in high-speed networks.

DETAILED DESCRIPTION

In various embodiments, checksum operations may be effected using an instruction set architecture (ISA) extension to compute checksum values. More specifically, a user-level instruction may be provided within an ISA to enable a programmer to directly perform a desired checksum operation such as a CRC operation in a general-purpose processor (e.g., a central processor unit (CPU)) via the instruction. The CRC operation may be a 32-bit CRC operation (i.e., a CRC32 operation generating a 32-bit running reminder, discussed further below), and in different embodiments may, for example, correspond to the CRC used in an Institute of Electrical and Electronics Engineers (IEEE) 802.3 Ethernet protocol (published 2002) or other protocols.

In different implementations, various opcode instructions may be provided to perform CRC computations on different groupings of data. For example, in some embodiments CRC computations may be supported on groups of 8, 16, 32 and 64 bits using different opcodes, although the scope of the present invention is not so limited. In this way, CRC calculations may be rapidly performed in hardware without the need for lookup tables or the like. Furthermore, the computations may be performed using generic, architecturally visible processor registers via integer operations performed according to the different opcodes. As a result, CRCs may be computed in a processor without the need for the overhead and complexity of offload hardware, such as network offload hardware. Accordingly, greater numbers of data transmissions (e.g., in terms of input/outputs (I/Os) per second) can occur. Note that while described primarily herein in connection with CRC operations, embodiments of the present invention may be used to perform other checksum operations.

Still further, to enable efficient use of these user-level instructions, embodiments of the present invention may further partition or segment data to be subjected to the checksum operations. As an example, data of an arbitrary size to be subjected to the checksum operations may be segmented into multiple groups of data each having a different base width. These base widths may correspond to the widths of the different opcode instructions, e.g., 8, 16, 32 or 64 bits. Furthermore, the partitions may be selected such that a majority of the data is in a partition corresponding to the widest width instruction to enable efficient operation. Additionally, the partition between different portions, e.g., a smallest width partition and a largest width partition, may correspond to a natural alignment boundary for the widest width. In this way, checksum operations may be implemented with the fewest number of iterations of data through the hardware.

Figure 1:
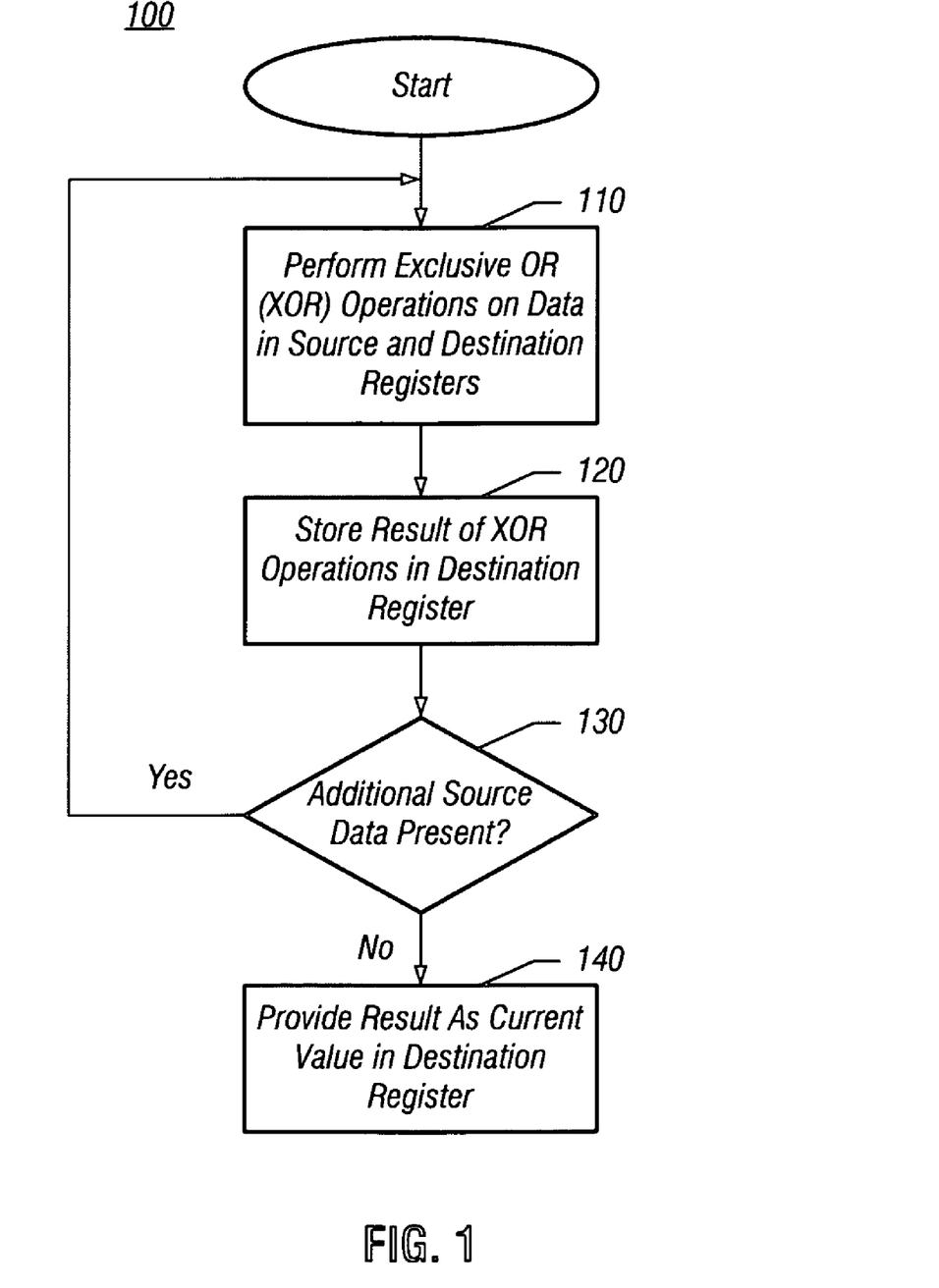
FIG. 1 is a flow diagram of a method in accordance with one embodiment of the present invention.

Referring now to FIG. 1, shown is a flow diagram of a method in accordance with one embodiment of the present invention. Method 100 may be used to obtain a checksum using a user-level instruction implemented on processor hardware, e.g., an execution unit of a CPU. As shown in FIG. 1, method 100 may begin by performing a series of exclusive-OR (XOR) operations on data in source and destination registers (block 110). Note that the XOR operations may correspond to a polynomial arithmetic operation and more particularly to a polynomial division operation. This operation may correspond to a polynomial division by a selected polynomial value. While this value may take many different forms in different embodiments, in particular implementations for performing CRC32 operations, the polynomial may correspond to 11 EDC6F41H, although the scope of the present invention is not so limited. The data in the source register may correspond, e.g., to data present in a processor pipeline that has been received by the processor or is to be transmitted therefrom. As an example, a group of data in a buffer corresponding to a desired group size (e.g., 16 bit, 32 bit or the like) may be provided to the source register, which may be a general-purpose register of the processor. Alternately, the source data may be obtained from a memory, in some embodiments. The destination register may correspond to a storage location for a running remainder obtained from the XOR operations. The destination register also may be a general-purpose register of the processor.

In various embodiments, the XOR operations may be performed in dedicated hardware within a processor pipeline. For example, an execution unit of a processor, e.g., an integer execution unit may be extended with circuitry to implement a series of XOR operations. For example, this circuitry may correspond to a XOR tree to handle polynomial division by a desired polynomial. In various embodiments, a polynomial for use in the XOR operations may be hard-wired into the logic gates of the XOR tree. Furthermore, the XOR tree may be configured to implement desired pre-processing and post-processing via the XOR operations, e.g., bit reflections and the like. Furthermore, the XOR tree logic may include multiple partitions, each configured to handle operations on different data sizes.

Still referring to FIG. 1, next a result, which may correspond to a running remainder obtained from the XOR operations, may be stored in the destination register (block 120). Note that the destination register may, upon initialization of a system, be set to a predetermined value, e.g., all ones, all zeros or another such value. Then during execution of checksum operations, this running remainder is continually updated with the result of the current checksum operation. More specifically, the remainder of the polynomial division implemented by the current checksum operation may be stored in the destination register.

Next, it may be determined whether additional source data is present (decision block 130). For example, in some embodiments a buffer may include data that has been received by a system and is to have a checksum verified. The data may be fed in chunks into the source register to effect the checksum operation. Accordingly, it may be determined in decision block 130 if additional source data is present in this buffer. As will be described further below, source data in a buffer may be partitioned into segments having differing base widths, with each base width corresponding to a different flavor of user-level checksum instruction. If so, the next data chunk may be provided to the source register, and control passes back to block 110, discussed above.

If instead at decision block 130 it is determined that no additional source data is present, control passes to block 140. There, the result of the checksum operation may be provided as the current value (e.g., running remainder) that is stored in the destination register (block 140). As discussed above, this checksum value may be used in many different manners. For example, in the case of received data, the computed checksum may be compared to a received checksum to confirm that the data was accurately received. In a transmission situation, the checksum may be appended to data to be transmitted so that the data may be verified on a receiving end. Of course other uses of checksums, such as for hash functions or generation of numbers pursuant to a pseudo random numbering scheme may also occur.

Figure 2:
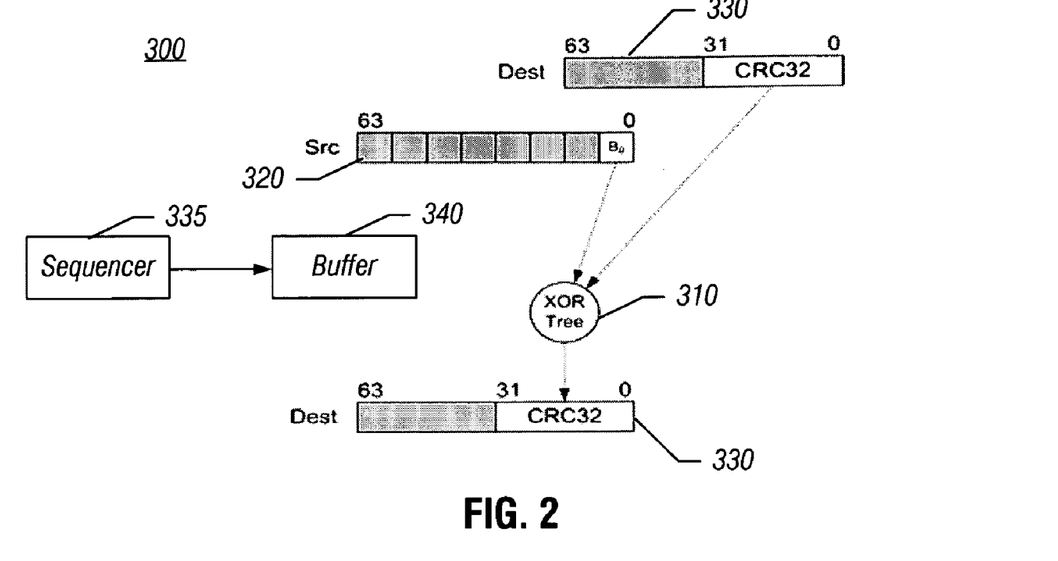
FIG. 2 is a block diagram of a portion of a processor to perform a checksum operation in accordance with an embodiment of the present invention.

A processor to implement checksum operations in accordance with an embodiment of the present invention may take many different forms depending on a desired architecture. Referring now to FIG. 2, shown is a block diagram of a portion of a processor to perform a checksum operation in accordance with an embodiment of the present invention. As shown in FIG. 2, a portion of a processor 300 is shown. More specifically, processor 300 includes an XOR tree 310, a first register 320 and a second register 330, all of which may be part of a processor pipeline. XOR tree 310 may be configured differently in various embodiments. For example, XOR tree 310 may be implemented using a plurality of 3-input XOR gates in a first level, outputs of which are coupled to similar XOR gates of a second level, and so forth. In such an embodiment, each level of the XOR tree may be a third as large as the previous level. Of course, other configurations are possible.

As further shown in FIG. 2, processor 300 includes a buffer 340, which also may be within the processor pipeline (e.g., as a buffer, queue or the like). Alternately, buffer 340 may be a cache memory associated with processor 300. Buffer 340 may be an arbitrarily-sized buffer to temporarily store data to be subjected to checksum operations. In some embodiments, this data may correspond to a size of a network protocol unit, for example. As further shown in FIG. 2, a sequencer 335 may be coupled to buffer 340. Sequencer 335 may include logic to perform data segmentation in accordance with an embodiment of the present invention to efficiently partition data within buffer 340 into different segments, each destined for execution of a checksum operation of a given data width.

In the embodiment of FIG. 2, first register 320 may correspond to a source register, while second register 330 may correspond to a destination register. In various embodiments, these registers may be general-purpose registers within processor 300. Of course, processor 300 may include many other registers, logic, functional units and the like, and the portion shown in FIG. 2 is for ease of illustration.

As shown in FIG. 2, to perform a checksum in accordance with an embodiment of the present invention, at least a first portion of first register 320 is provided to XOR tree 310, along with a portion of second register 330. In the embodiment shown in FIG. 2, which illustrates an 8-bit CRC accumulation, a single byte of data ($B_0$) is provided to XOR tree 310 from first register 320, while a 4-byte portion of second register 330 is provided to XOR tree 310. This 4-byte portion may correspond to the running remainder of a CRC32 operation. Using this data, XOR tree 310 may perform data manipulations via XOR operations to generate a result that includes a remainder portion. This remainder portion may be the running remainder that is stored back in second register 330, as shown in FIG. 2. In this way, CRC operations can be efficiently performed in minimal cycle time and using minimal processor resources. In the embodiment of FIG. 2, for 8-bit accumulate operations, additional portions of first register 320 may be provided incrementally to XOR tree 310 along with the current contents of second register 330 (i.e., the 32-bit running remainder). Accordingly, to obtain a CRC checksum on 64 bits of data in first register 320, eight iterations of XOR operations in XOR tree 310 may be performed, each using a single byte of data from first register 320, along with the current running remainder in second register 330.

Figure 3:
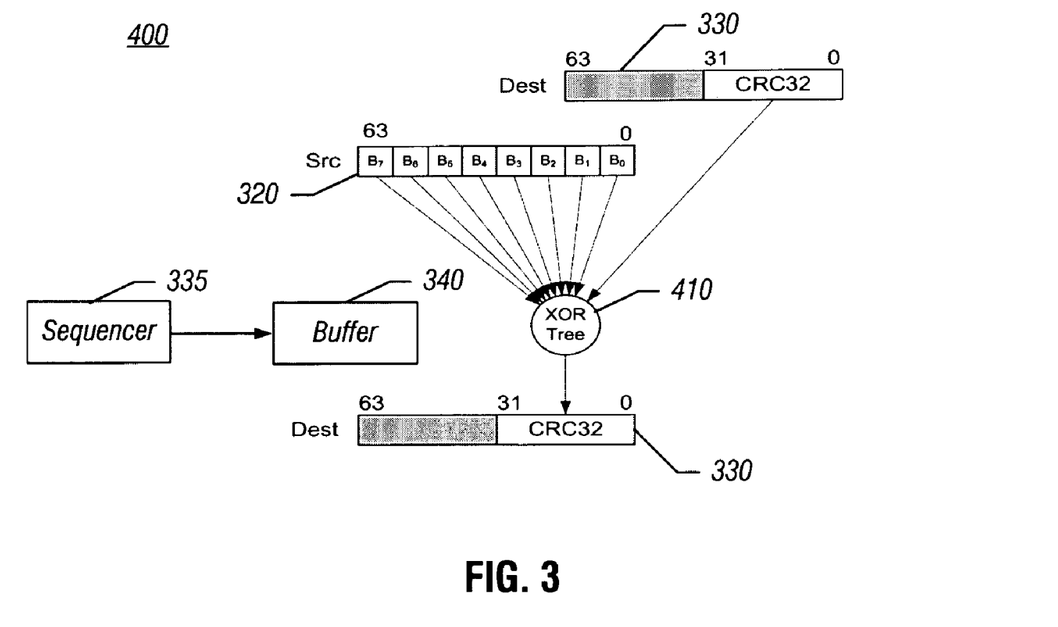
FIG. 3 is a block diagram of another portion of a processor in accordance with an embodiment of the present invention.

Note that different hardware may be present to handle CRC calculations of different bit widths. For example, logic may include different XOR tree structures to handle such CRC calculations. Referring now to FIG. 3, shown is a block diagram of another portion of a processor in accordance with an embodiment of the present invention. As shown in FIG. 3, processor 400 includes a different XOR tree 410 (e.g., in addition to XOR tree 310 of FIG. 2) that is coupled to receive data from first register 320 and second register 330. As further shown in FIG. 3, buffer 340 is present and may be used to provide data for CRC computations. Sequencer 335 may control partitioning of data in buffer 340 into different segments. Note that in the embodiment of FIG. 3, XOR tree 410 is configured to handle a 64-bit CRC accumulation. Accordingly, the entire contents of first register 320 (i.e., bytes $B_0$-$B_7$) may be coupled at one time to XOR tree 410 for manipulation in XOR operations with data in second register 330. The result data, the desired portion of which corresponds to a running remainder, is stored back in second register 330. While described with these particular implementations in FIGS. 2 and 3, it is to be understood that the scope of the present invention is not so limited, and in other embodiments different hardware configurations for performing CRC operations may be present.

Referring now to Table 1 below, shown is a listing of example instructions of an instruction set architecture (ISA) to support CRC operations in accordance with various embodiments of the present invention. As shown in Table 1, each instruction, which may be referenced by an opcode, is used to perform a CRC32 operation using a source register and a destination register. As shown, differs flavors are possible, with each instruction to perform the CRC operation on a given size of destination operand and source operand. Thus with reference to the first line of Table 1, this instruction is used to perform a CRC32 operation on an 8-bit source operand and a 32-bit destination operand. Similarly, the second line of Table 1 is used to perform a CRC32 operation on a 16-bit source operand and a 32-bit destination operand. In similar fashion, the third line of Table 1 shows an instruction to perform a CRC32 operation on a 32-bit source operand and a 32-bit destination operand.

Because these first three instructions are performed with maximum data chunks of 32 bits, note that the instructions are valid in both a 64-bit mode of operation as well as a legacy (i.e., 32-bit) mode of operation. In contrast, the fourth and fifth lines of Table 1 denote CRC operations to be performed on 8-bit and 64-bit source operands, respectively with a 64-bit destination operand. Thus these final two instructions may be performed only in a 64-bit mode of operation.

TABLE 1

| Opcode | Instruction | Description |
| --- | --- | --- |
| Code 2 | CRC32 r32, r/m8 | Accumulate CRC32 on r/m8 |
| Code 1 | CRC32 r32, r/m16 | Accumulate CRC32 on r/m16 |
| Code 1 | CRC32 r32, r/m32 | Accumulate CRC32 on r/m32 |
| Code 2 | CRC32 r64, r/m8 | Accumulate CRC32 on r/m8 |
| Code 1 | CRC32 r64, r/m64 | Accumulate CRC32 on r/m64 |

In various embodiments, these user-level instructions may be used by a programmer, e.g., as intrinsics to implement a CRC operation in accordance with the flow diagram of FIG. 1, for example.

Figure 4:
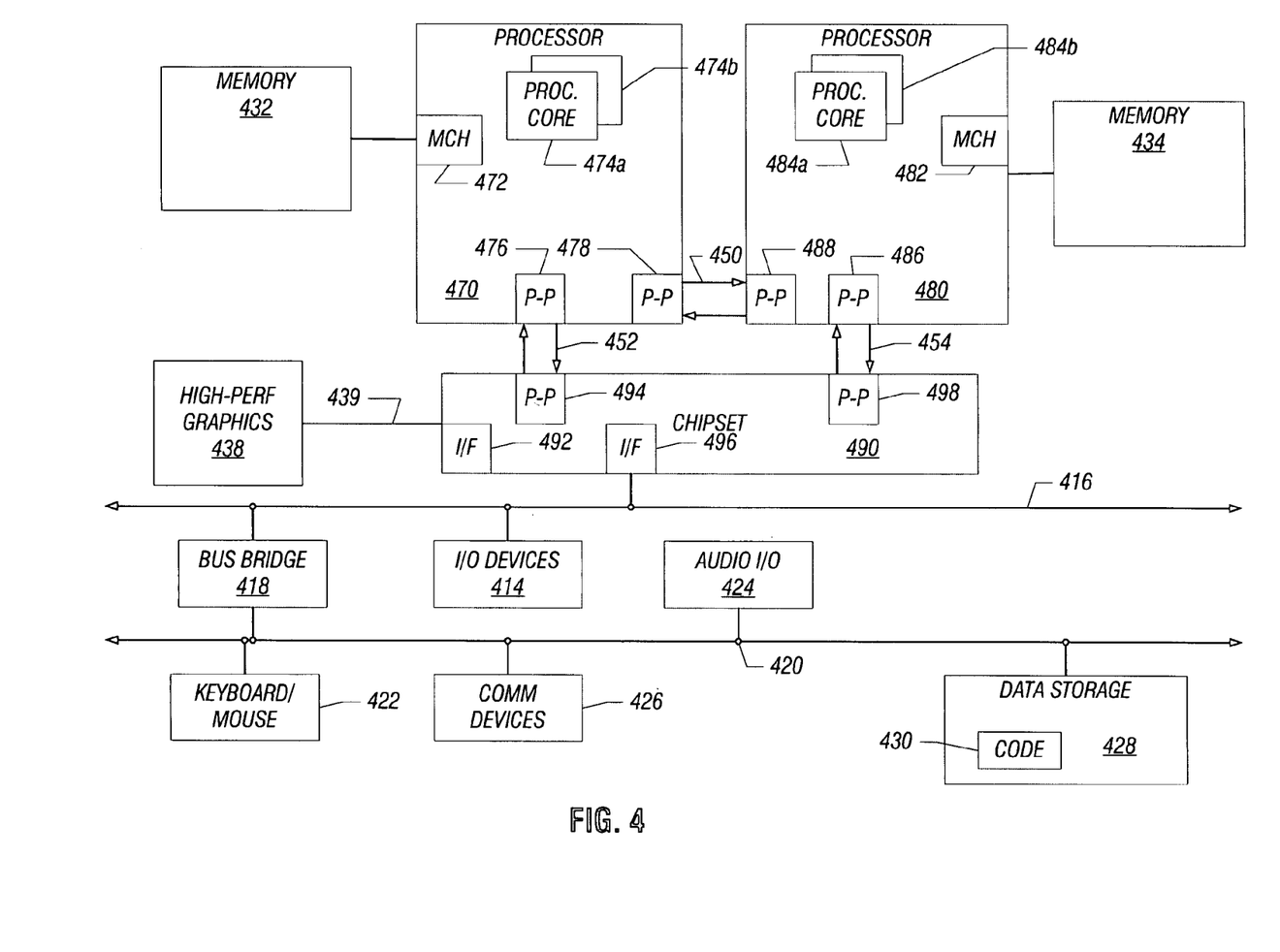
FIG. 4 is a block diagram of a system in accordance with an embodiment of the present invention.

Embodiments may be implemented in many different system types. Referring now to FIG. 4, shown is a block diagram of a multiprocessor system in accordance with an embodiment of the present invention. As shown in FIG. 4, the multiprocessor system is a point-to-point interconnect system, and includes a first processor 470 and a second processor 480 coupled via a point-to-point interconnect 450. As shown in FIG. 4, each of processors 470 and 480 may be multicore processors, including first and second processor cores (i.e., processor cores 474a and 474b and processor cores 484a and 484b). While not shown for ease of illustration, first processor 470 and second processor 480 (and more specifically the cores therein) may include XOR tree logic within their execution units to execute user-level CRC instructions in accordance with an embodiment of the present invention. First processor 470 further includes a memory controller hub (MCH) 472 and point-to-point (P-P) interfaces 476 and 478. Similarly, second processor 480 includes a MCH 482 and P-P interfaces 486 and 488. As shown in FIG. 4, MCH's 472 and 482 couple the processors to respective memories, namely a memory 432 and a memory 434.

First processor 470 and second processor 480 may be coupled to a chipset 490 via P-P interconnects 452 and 454, respectively. As shown in FIG. 4, chipset 490 includes P-P interfaces 494 and 498. Furthermore, chipset 490 includes an interface 492 to couple chipset 490 with a high performance graphics engine 438. In one embodiment, a point-to-point interconnect 439 may couple these components. In turn, chipset 490 may be coupled to a first bus 416 via an interface 496.

As shown in FIG. 4, various input/output (I/O) devices 414 may be coupled to first bus 416, along with a bus bridge 418, which couples first bus 416 to a second bus 420. I/O devices 414 may include at least one component capable of providing intercommunication between the multiprocessor system and a network (not shown in FIG. 4) in compliance with any applicable protocols. In one embodiment, I/O devices 414 may include any combination of digital and/or analog hardware and/or software of an I/O subsystem that may process one or more network protocol units to be transmitted and/or received over a network. In one embodiment, the I/O subsystem may include, for example, a network interface card (NIC) which may include, for example, a media access control (MAC) layer of the Data Link Layer (DLL) as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

Still referring to FIG. 4, in one embodiment, second bus 420, coupled to first bus 416 via bus bridge 418, may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420. Note that other architectures are possible. For example, instead of the point-to-point architecture of FIG. 4, a system may implement a multi-drop bus or another such architecture.

As mentioned above, in various embodiments the multiprocessor system of FIG. 4 may be coupled to a network, which may be any network such as the Internet, an intranet, a local area network (LAN), storage area network (SAN), a wide area network (WAN), a metro area network (MAN) or wireless network. Such a network may exchange traffic with I/O devices 414 using, e.g., the Ethernet standard (described in the IEEE 802.3 protocol and related standards) or any other communications standard, and the traffic may include checksums in accordance with an embodiment of the present invention.

Figure 5:
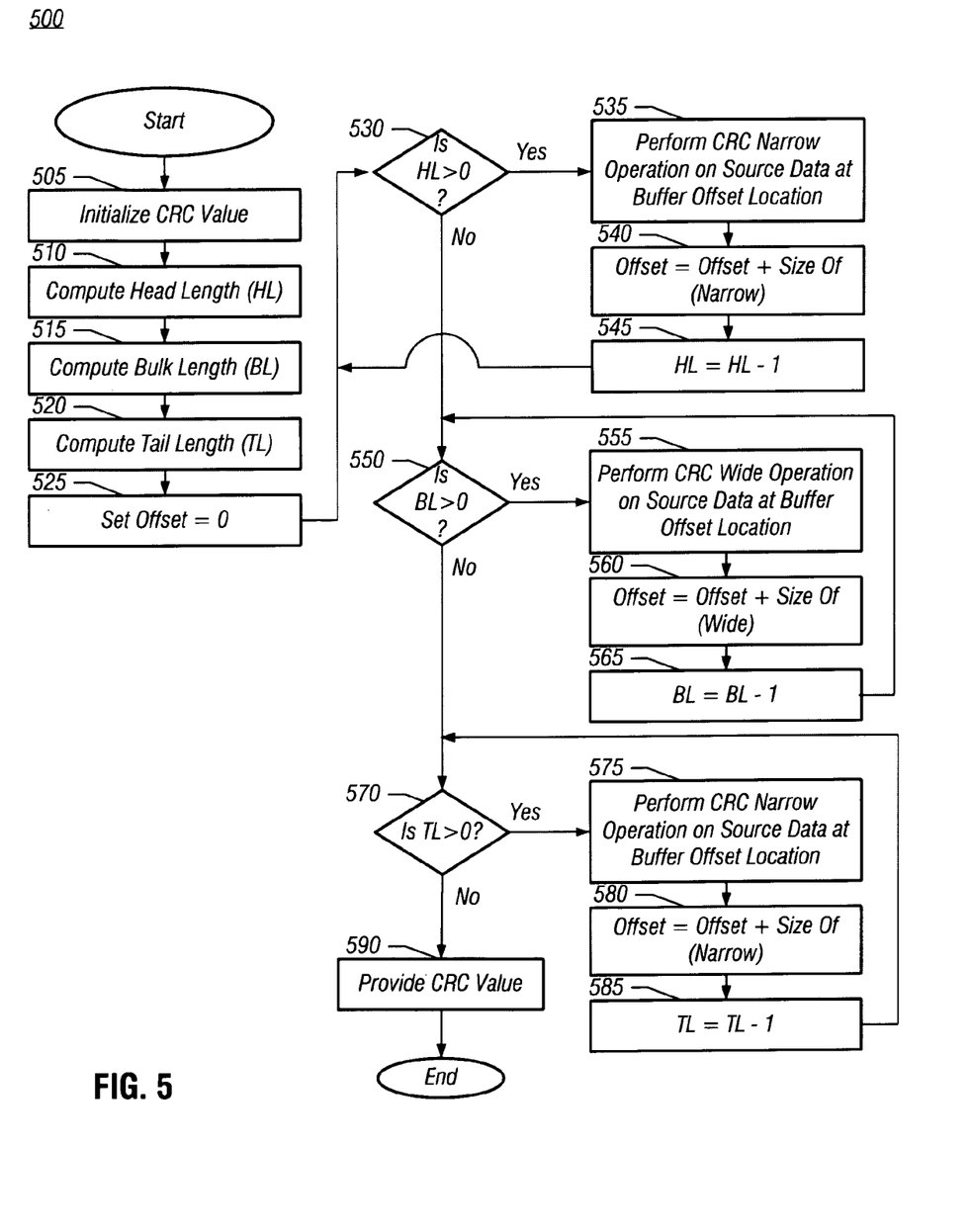
FIG. 5 is a flow diagram of a method of generating a checksum value in accordance with an embodiment of the present invention.

Note that the data incoming to a system may be of a network protocol unit, for example, or an arbitrary size. When received by a system, such data may be temporarily stored in a buffer, e.g., a buffer of an arbitrary size. To effectively perform checksum calculations such as a CRC operation on the data, embodiments may partition the data into predetermined chunk sizes for efficient checksum operations. Referring now to FIG. 5, shown is a flow diagram of a method of generating a CRC value for a data block of an arbitrary size in an arbitrarily-sized buffer in accordance with an embodiment of the present invention. As shown in FIG. 5, method 500 may begin by initializing a CRC value (block 505). In one embodiment, the CRC value may be stored in a destination register. While in various embodiments, different initial values for a CRC value can exist, in one embodiment the initial CRC value may correspond to all logic ones, and in an embodiment for CRC32 operations, the initial CRC value may correspond to FFFFH, although the scope of the present invention is not so limited.

Still referring to FIG. 5, next various lengths may be determined for the data block in the buffer. More specifically, a head length (HL) may first be computed (block 510). This HL may correspond to an initial amount of data in the buffer before a first natural alignment boundary for a wide version of a CRC operation occurs. For example, in an implementation in which a user-level CRC instruction takes different forms, with a widest version available to execute on 64-bit operands, the first natural alignment boundary may correspond to a first position in the arbitrary buffer at which a natural alignment boundary for 64-bit data occurs. Accordingly, the HL computed in block 510 may correspond to a number of bytes, for example, from the beginning of the buffer to the first natural alignment boundary for 64-bit data. This head length may be less than 7 bytes, where the wide version of the instruction corresponds to 64 bits.

Next, a bulk length (BL) may be computed (block 515), which corresponds to an amount of data in the buffer from the first natural alignment boundary until no additional wide variants of the CRC operation can be performed. For example, with respect to 64-bit wide operations the bulk length may thus terminate at a natural alignment boundary within 63 bits of the end of the buffer. Upon computation of the bulk length in block 515, control passes to block 520. There a tail length (TL) may be computed (block 520). This tail length may correspond to the remaining block of data in the buffer from the last natural alignment to the end of the buffer. Different entities may perform the above operations. In one embodiment, a sequencer, which may be a software-implemented state machine such as sequencer 335 shown in FIGS. 2 and 3, may perform an analysis of the buffer to generate the various lengths. Upon completion of computing the different lengths of the buffer portions, an offset may be set to zero (block 525). An offset of zero may correspond to the beginning of the buffer, in one embodiment.

Still referring to FIG. 5, next it may be determined whether the HL is greater than zero (decision block 530). If so, this means that data remains present in the first portion of the buffer. Accordingly, control passes to block 535. There, the CRC operation, which may correspond to a narrow version of a user-level CRC instruction, may be performed (block 535). More specifically, the CRC operation may be performed using source data at a buffer offset location (i.e., corresponding to the beginning of the buffer in a first iteration) and destination data, which may correspond to a running remainder value in a destination register (i.e., the initialized CRC value in the first iteration). While the CRC operation may be effected in various ways, in one implementation the CRC operation may be performed in dedicated hardware of a processor pipeline for performing CRC operations on narrow data (e.g., single-byte source data).

Upon completion of the CRC operation, control passes to block 540. There, the offset may be set equal to the current offset plus the size of the narrow data form, e.g., 1 byte (block 540). Next, the HL may be decremented by one (block 545). These operations thus advance the buffer to a next portion of the source data. Then control passes back to decision block 530 to determine if the head length is still greater than zero (decision block 530). If so, blocks 535, 540, and 545 are performed in a loop fashion until the source data in the first portion of the buffer is exhausted. When the source data in the first portion of the buffer is exhausted (i.e., the first natural alignment boundary has been reached), decision block 530 will determine that the HL is not greater than zero, and accordingly control passes to decision block 550.

At decision block 550, it may be determined whether the bulk length is greater than zero. If so, data of the wide format (e.g., 64 bits) present in the second portion of the buffer is to be processed. Accordingly, control passes to block 555. There, the CRC operation, which may correspond to a wide version of the user-level CRC instruction, may be performed (block 555). More specifically, the CRC operation may be performed using source data at the current buffer offset location (i.e., corresponding to the first natural alignment boundary for 64-bit data in a first iteration) and destination data, which may correspond to the current running remainder value in the destination register (i.e., the CRC value present upon completion of the narrow form execution in the first iteration). While the CRC operation may be effected in various ways, in one implementation the CRC value may be performed in dedicated hardware of the pipeline for performing CRC operations on wide data (e.g., 8-byte source data). Note that in various embodiments, this dedicated hardware may be different than the hardware that performs the narrow form. Upon completion of the CRC operation, control passes to block 560. There, the offset may be set equal to the current offset plus the size of the wide data form, e.g., 8 bytes (block 560). Next, the BL may be decremented by one (block 565).

Control then passes back to decision block 550. When the loop including blocks 555, 560 and 565 has been executed one or more times such that the bulk length is decremented to zero, decision block 550 determines that no additional BL remains, and accordingly control passes to decision block 570. There, it may be determined whether the tail length is greater than zero (decision block 570). If so, control passes to block 575. The CRC operation, which again may correspond to the narrow version of the user-level CRC instruction, may be performed (block 575). More specifically, the CRC operation may be performed using source data at the buffer offset location (i.e., corresponding to the last natural alignment boundary for the wide data before the end of the buffer in a first iteration) and destination data, which may correspond to the running remainder value in the destination register (i.e., the current CRC value at the conclusion of the wide form CRC operation in the first iteration). In one implementation, the CRC operation may be performed in the dedicated hardware of the processor pipeline for performing CRC operations on narrow data. Upon completion of the CRC operation, control passes to block 580. There, the offset may be set equal to the current offset plus the size of the narrow data form, e.g., 1 byte (block 580). Next, the TL may be decremented by one (block 585).

Control then passes back to decision block 570. When it is determined at decision block 570 that the tail length is not greater than zero, this means that no additional data is present in the buffer. Accordingly, control passes to block 590. There, the CRC value may be provided to, for example, a predetermined location for use as desired by a particular application (block 590). This CRC value may thus correspond to a checksum for the amount of data in the buffer. In one embodiment, a destination register which stores the incrementally-accumulated CRC value during performance of method 500 may provide the value for the desired use. Examples of such uses may be as a calculated checksum to append to data to be transmitted from a system or a generated checksum to compare to a checksum received with incoming data. Alternately, such a checksum may be used as a hash function, generated pseudorandom number or the like.

In particular embodiments, method 500 may be used with two different user-level instructions to effect CRC operations on different data sizes, corresponding to a narrow form and a wide form. In one embodiment, the narrow form may correspond to a single byte, while the wide form corresponds to 8 bytes, although the scope of the present invention is not so limited. For example, in other embodiments, additional segmentations of data in the buffer may be effected to correspond to additional flavors of the CRC operation (e.g., 16-bit or 32-bit chunks). In the embodiment shown in FIG. 5, using method 500, a narrow version of a CRC instruction may be executed up to a first natural alignment boundary for efficient use of a wide form of the CRC instruction. The wide form may then be used for the bulk of the data in the buffer, and then the narrow form of the instruction may again be executed from the last natural alignment boundary of the buffer for any residual data. While described with this particular implementation of FIG. 5, it is to be understood that the scope of the present invention is not so limited.

Using embodiments of the present invention, data validations, for example, may be performed using one or more CRC instructions that are more efficient in time than a pure software-based approach. That is, a processor may execute fewer cycles to calculate a CRC value in accordance with an embodiment of the present invention than with a software-based approach. Use of such CRC instructions may be more cache efficient, as the instruction may occupy less instruction cache space or may have a smaller instruction cache footprint than a software-based method. Furthermore, without the need for lookup tables, a data cache pollution effect can be avoided. Furthermore, fewer processor cycles to effect the CRC operation reduces power consumption. Accordingly, some embodiments may be implemented in a portable or wireless system that often runs on battery power, although the scope of the present invention is not limited in this regard.

Figure 6:
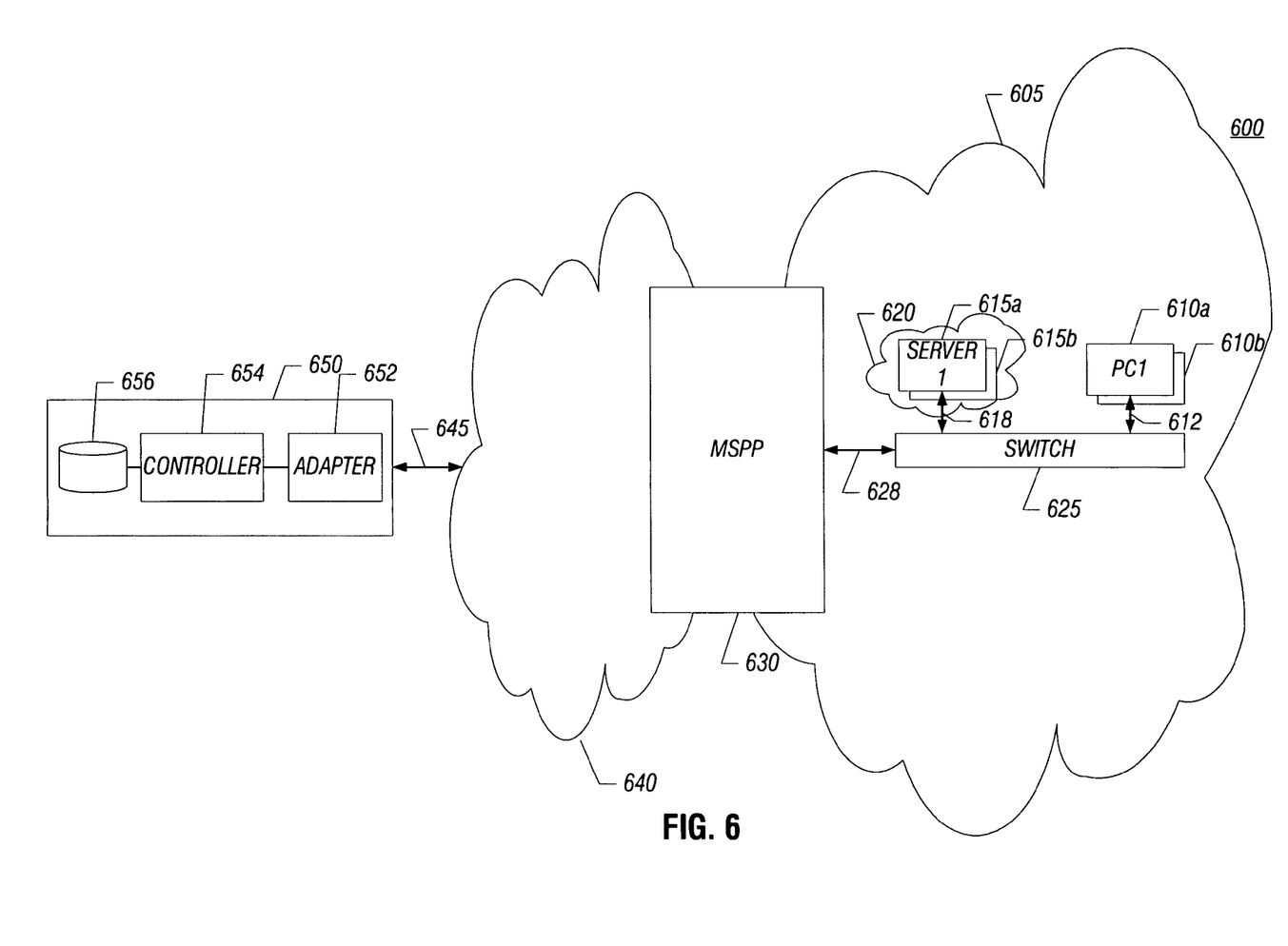
FIG. 6 is a block diagram of a network configuration in which embodiments of the present invention may be used.

Referring now to FIG. 6, shown is a block diagram of a network configuration in which embodiments of the present invention may be used. As shown in FIG. 6, a network system 600 may link various entities. Specifically, as shown in FIG. 6, an enterprise network 605 may be coupled via a metro area network (MAN) 640 to a storage area network (SAN) 650. While shown with this particular implementation in the embodiment of FIG. 6, it is to be understood that the scope of the present invention is not so limited. Still referring to FIG. 6, enterprise network 605 may include various components, including individual systems, such as personal computers (PCs) 610a and 610b coupled via links 612 to a switch 625. Enterprise network 605, which may be an Ethernet-based enterprise network, may further include a data center 620 that may include one or more servers 615a and 615b, also coupled to switch 625 via links 618. In one embodiment, links 612 and 618 may be Ethernet links, e.g., 1 gigabyte Ethernet (GbE) links, although other such links are possible. In one embodiment, switch 625 may include MACs, switch fabrics and the like.

In turn, switch 625 may be coupled via a link 628, which may also be a Ethernet link, to a multi-service provisioning platform (MSPP) 630. In various embodiments, MSPP 630 may include different components including, for example, transceivers, multiplexer/demultiplexers, framers, MACs, and the like. MSPP 630 is coupled to MAN 640, e.g., via an optical link, such as an optical carrier level (OC)-192 optical link.

Still referring to FIG. 6, MAN 640 may be coupled to SAN 650 via a link 645. SAN 650 may include various components, including, for example, an adapter 652, a controller 654, and a plurality of storage devices 656, which may be a redundant array of independent disks (RAID) or other such storage mechanisms. Adapter 652 may be capable of communicating with storage devices 656 in accordance with various protocols such as Small Computer Systems Interface (SCSI), Fibre Channel (FC), and/or Serial Advanced Technology Attachment (S-ATA), as examples.

To confirm validity of data passing through network system 600, various components within the system may perform data validations, e.g., CRC computations in accordance with an embodiment of the present invention. Accordingly, processors within servers 615a and 615b, computers 610a and 610b and controller 654 of SAN 650, for example, each may be adapted to perform CRC operations in accordance with user-level checksum instructions, such as those provided in embodiments of the present invention. While described with this particular implementation in the embodiment of FIG. 6, it is to be understood that the scope of the present invention is not so limited Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations there from. It is intended that the appended claims cover all such modifications and variations as fall within the true spirit and scope of this present invention.

What is claimed is:

1. A method comprising:
    determining from a data block in a buffer a number of first operands in a first portion of the buffer and a number of second operands in a second portion of the buffer;
    iteratively performing a cyclic redundancy checksum (CRC) operation on the first operands, wherein the first operands are of a first length, each iteration using destination data in a destination storage and storing a result in the destination storage as the destination data; and
    iteratively performing the CRC operation on the second operands, wherein the second operands are of a second length, the second length greater than the first length, each iteration using the destination data in the destination storage and storing a result in the destination storage as the destination data.

2. The method of claim 1, further comprising performing the CRC operation on the first operands in response to a first user-level instruction for the CRC operation, the first user-level instruction corresponding to the first length.

3. The method of claim 2, further comprising performing the CRC operation on the second operands in response to a second user-level instruction for the CRC operation, the second user-level instruction corresponding to the second length.

4. The method of claim 1, further comprising performing the CRC operation in a hardware engine of a general-purpose processor.

5. The method of claim 4, further comprising performing the CRC operation on the first operands in a first block of the hardware engine and performing the CRC operations on the second operands in a second block of the hardware engine.

6. The method of claim 1, wherein a starting address of the second portion of the buffer corresponds to a natural alignment boundary for the second length.

7. The method of claim 1, further comprising determining from the data block a number of third operands in a third portion of the buffer, wherein the third operands are of the first length.

8. The method of claim 7, further comprising iteratively performing the CRC operation on the third operands in response to a first user-level instruction for the CRC operation, the first user-level instruction corresponding to the first length.

9. An article comprising a machine-accessible medium including instructions that when executed cause a system to:
perform a checksum operation on data in a buffer according to a first user-level checksum instruction iteratively executed in a first logic block of an execution unit of a processor for sourcedata of a first width until a natural alignment boundary for source data of a second width is reached; and
perform the checksum operation on data in the buffer according to a second user-level checksum instruction iteratively executed in a second logic block of the execution unit for the source data of the second width after the natural alignment boundary is reached.

10. The article of claim 9, further comprising instructions that when executed cause the system to determine a head length corresponding to a first portion of data in the buffer, the first portion extending from a beginning of the buffer to the natural alignment boundary.

11. The article of claim 10, further comprising instructions that when executed cause the system to determine a bulk length corresponding to a second portion of data in the buffer, the second portion beginning at the natural alignment boundary.

12. The article of claim 9, further comprising instructions that when executed cause the system to store a running remainder for the checksum operation in a destination register and provide at least a portion of the contents of the destination register with source data of the first width to the first logic block.

13. A method comprising:
determining from a data block in a buffer a number of first operands in a first portion of the buffer and a number of second operands in a second portion of the buffer;
iteratively performing a cyclic redundancy checksum (CRC) operation on each of the first operands using a first user-level checksum instruction, wherein the first operands are of a first length, each iteration operating on a first operand and a destination operand and storing a result in a destination location, the destination operand obtained from the destination location; and
iteratively performing the CRC operation on each of the second operands, wherein the second operands are of a second length, the second length greater than the first length, each iteration operating on a second operand and the destination operand and storing a result in the destination location, wherein an iteration on a first one of the second operands uses the result of a final iteration of the CRC operation on a final one of the first operands.

14. The method of claim 13, wherein the first user-level checksum instruction corresponds to the first length.

15. The method of claim 14, wherein the second user-level checksum instruction corresponds to the second length.

16. An apparatus comprising:
a processor including a sequencer to determine from a data block in a buffer a number of first operands in a first portion of the buffer and a number of second operands in a second portion of the buffer, a first logic block to iteratively perform a cyclic redundancy checksum (CRC) operation on the first operands, wherein the first operands are of a first length, each iteration using destination data in a destination storage and storing a result in the destination storage as the destination data, and a second logic block to iteratively perform the CRC operation on the second operands, wherein the second operands are of a second length, the second length greater than the first length, each iteration using the destination data in the destination storage and storing a result in the destination storage as the destination data.

17. The apparatus of claim 16, wherein the processor is to perform the CRC operation on the first operands in response to a first user-level instruction for the CRC operation, the first user-level instruction corresponding to the first length.

18. The apparatus of claim 17, wherein the processor is to perform the CRC operation on the second operands in response to a second user-level instruction for the CRC operation, the second user-level instruction corresponding to the second length.

* * * * *